July 21, 1953
N. F. ALVARE
2,646,178
TRANSPORTING APPARATUS
Filed Jan. 5, 1950
4 Sheets-Sheet 1
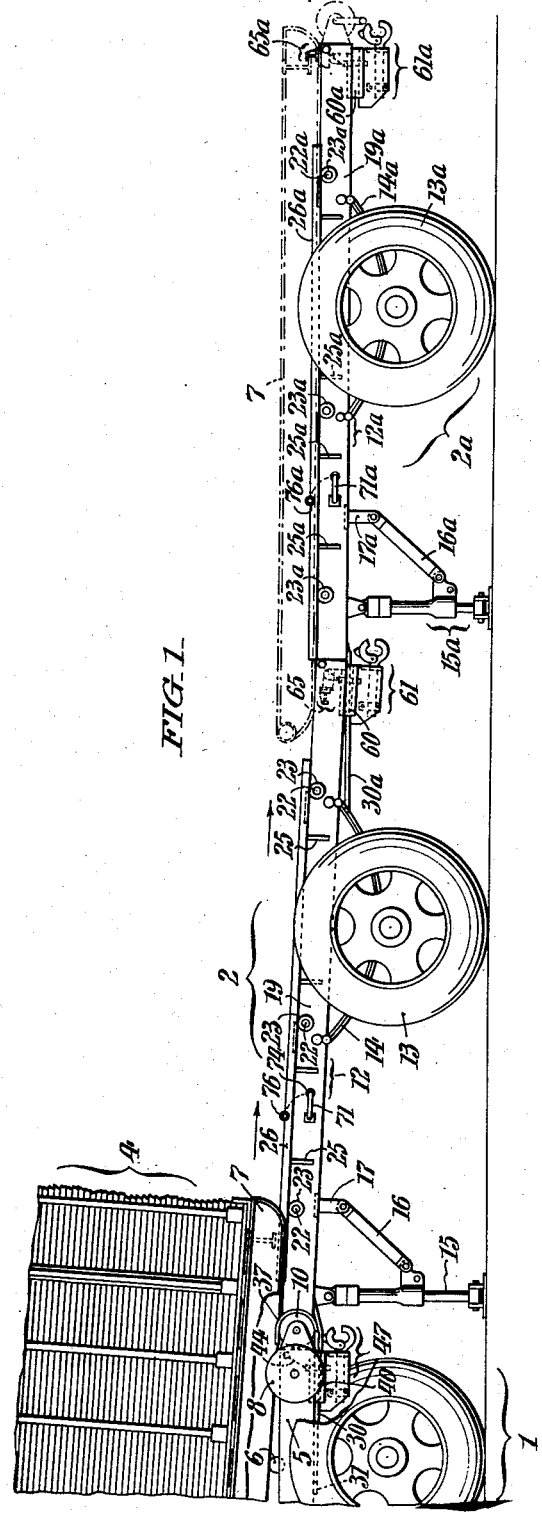
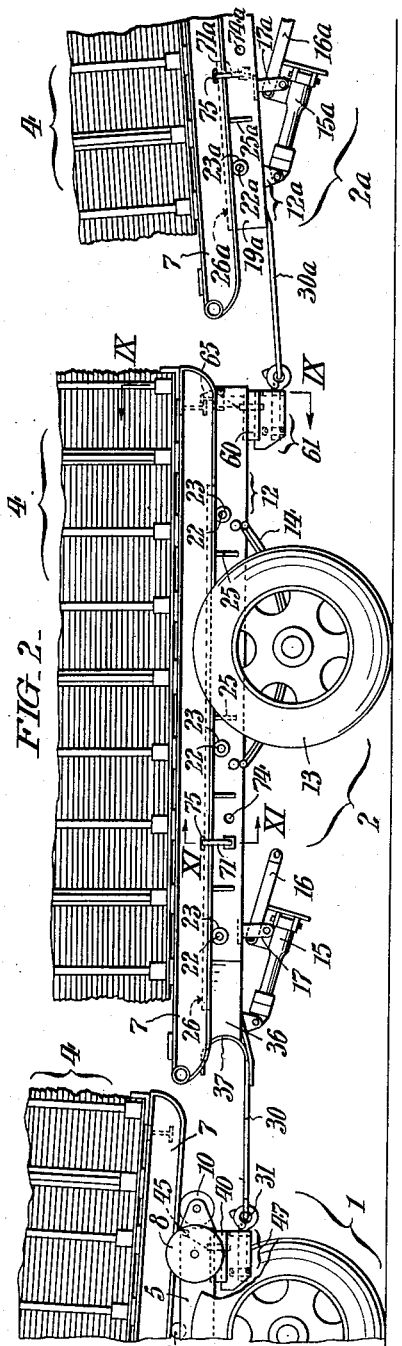
INVENTOR:
*Nemesio F. Alvare,*
BY *Paul & Paul*
ATTORNEYS.

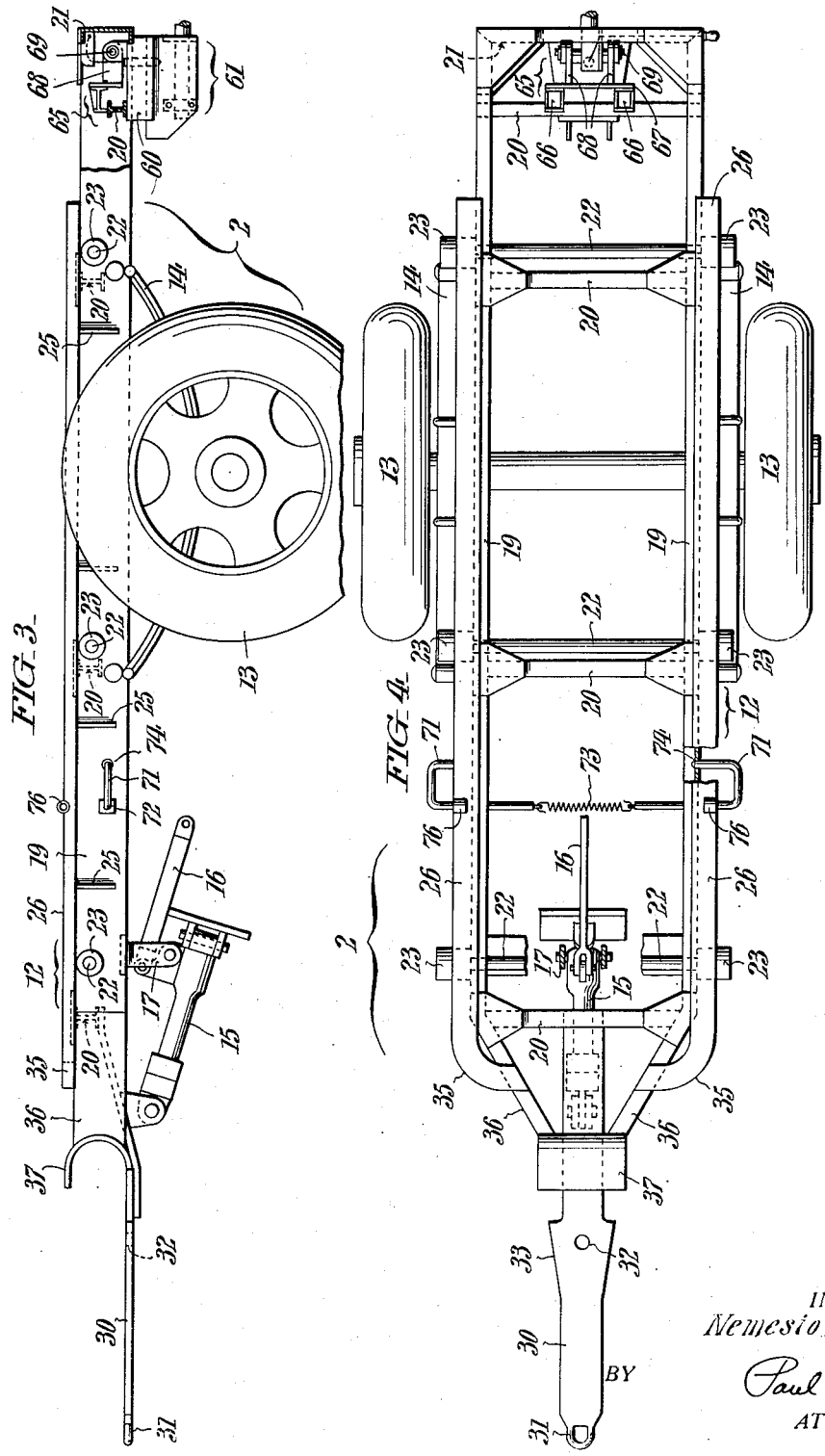

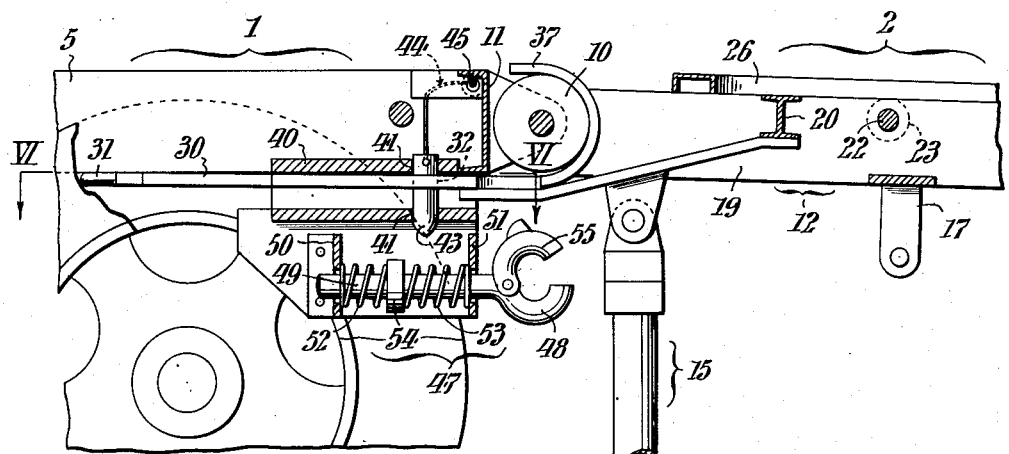

July 21, 1953 N. F. ALVARE 2,646,178
TRANSPORTING APPARATUS
Filed Jan. 5, 1950 4 Sheets-Sheet 4
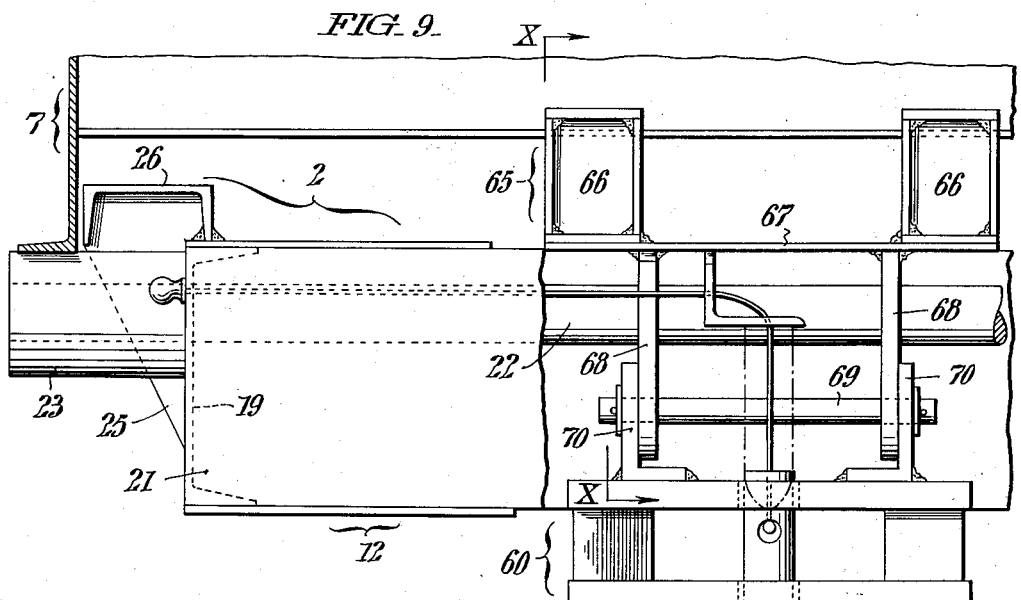
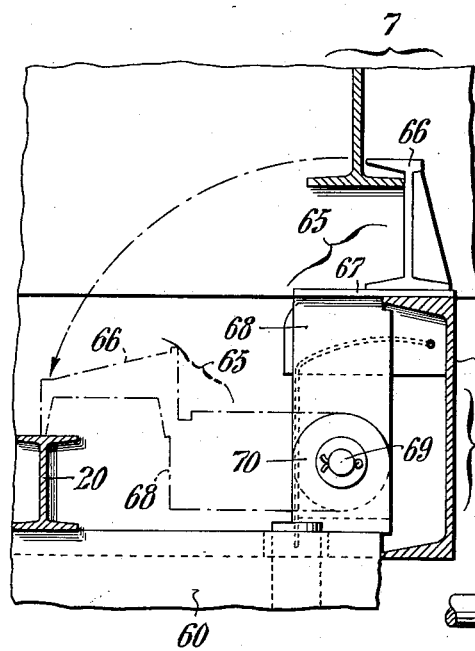
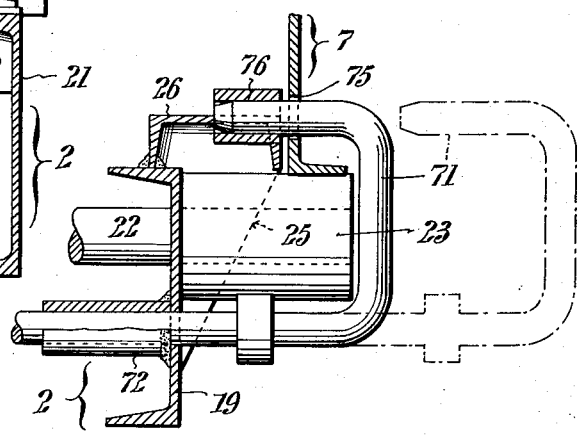
WITNESSES
A. J. Brittingham
Hubert Fuchs
INVENTOR:
Nemesio F. Alvare
BY Paul & Paul
ATTORNEYS.

Patented July 21, 1953

2,646,178

UNITED STATES PATENT OFFICE 2,646,178

TRANSPORTING APPARATUS

Nemesio F. Alvare, Philadelphia, Pa.

Application January 5, 1950, Serial No. 136,895

5 Claims. (Cl. 214—38)

This invention relates to transporting apparatus useful for example in transporting sugar cane or the like in bulk from the fields where it is grown, to refineries or to relatively distant railway freight stations for further shipment. In a copending patent application Serial No. 74,814, filed by me on February 5, 1949, now Patent No. 2,604,219, there is disclosed a motor truck for transporting a skid of special construction after it is filled with the cut cane at the field, said truck being equipped with power actuated means whereby the loaded skid is drawn from the ground level into position on the truck and locked against the possibility of displacement during transit.

The use of the apparatus of this copending application has proven to be highly successful in actual practice, and has made possible great savings in labor costs in the handling and transportation of products or materials of the kind referred to over the methods and facilities available prior to its conception.

The chief aim of my present invention is to make even greater economies possible in handling and transporting farm and other products. This objective is realized, as hereinafter more fully set forth, through the provision of trailers with means by which they can be initially hitched one to another and the leading one in the train to a truck characterized as above with their chassis frames rigidly connected and held in direct alignment during transfer to them of individual loaded skids successively brought up by the truck, and by which after complete loading of the train, the trailers can be loosely coupled relative to each other and to the truck for capacity to swivel during transit.

Other important objectives and attendant advantages will appear from the following detailed description of the attached drawings, wherein Fig. 1 is a view in side elevation, of a train consisting of a motor truck and a plurality of trailers conveniently embodying my invention, with the trailers close coupled to receive individual loaded skids from said truck.

Fig. 2 is a view like Fig. 1 with the several units loose coupled for swivelling during transit.

Fig. 3 is a view drawn to a larger scale and showing the leading trailer of the series in side elevation.

Fig. 4 shows the trailer of Fig. 3 in top plan.

Fig. 5 is a fragmentary view in longitudinal section of the coupling arrangement between the truck and the leading trailer, drawn to a still larger scale.

Fig. 6 is a fragmentary view in horizontal section taken as indicated by the angled arrows VI—VI in Fig. 5.

Fig. 7 is a fragmentary view showing the front end of the next trailer in top plan.

Fig. 8 is a longitudinal section taken as indicated by the angled arrows VIII—VIII in Fig. 7.

Fig. 9 is a fragmentary view, partly in elevation and partly in transverse section, taken as indicated by the angled arrows IX—IX in Fig. 2.

Fig. 10 is a fragmentary detail view in longitudinal section, taken as indicated by the angled arrows X—X in Fig. 9; and Fig. 11 is a fragmentary detail view in transverse section taken as indicated by the angled arrows XI—XI in Fig. 2.

With more detailed reference, first more particularly to Figs. 1 and 2 of these illustrations, the numeral 1 comprehensively designates the motor truck; the numerals 2 and 2a, the trailers; and the numeral 4, the skids. As in my copending application, the truck 1 has, at intervals along the side longitudinals 5 of its chassis frame, outwardly projecting transverse rollers such as the one indicated at 6 which are disposed in a plane at a slight rearward declination to the horizontal, whereon the runners 7 of the skids are adapted to rest. Larger rollers, such as the one indicated at 8 at the rear end of the chassis frame, aid in centering the skids on the truck incident to loading. The skids are drawn onto the truck by a pull cable (not shown) actuated from a power winch (not shown) at the front end of the truck. In this operation, the cable is connected to the front end of the skid and guided by a centrally grooved roller 10 rotatively supported on the rear transverse member 11 of the truck chassis frame, in the manner fully explained in the copending application, supra.

Except as hereinafter noted, the trailers 2 and 2a are identical. Accordingly, the description about to follow of the trailer 2 will serve also for the trailer 2a whereof the corresponding parts designated by the same reference numerals but with the letter "a" added in each instance for convenience of more ready distinction. As shown, the chassis frame 12 of trailer 2 is of structural iron and sustained medially of its length by a pair of wheels 13, with interposition of springs 14. For temporary support of the front end of the chassis frame of the trailer 2 during loading, there is shown a pivotally connected jack 15 which may be either of the mechanical or hydraulic type, and which is held against collapse in upright position by a strut link 16 whereof the distal end is securable by a removable pin to a lug 17 on the chassis frame 12. By virtue of this arrangement, the jack 15 can be swung up out of the way as shown in Fig. 2 and so held when its use is not required. The side longitudinals 19 of the trailer chassis frame are rigidly connected by spaced intermediate and end cross members 20 and 21, see Fig. 3, and through said longitudinals extend, similarly at lengthwise intervals, transverse shafts 22 with rollers 23 at their protruding ends on which the runners 7 of a skid are adapted to rest in the same manner as above described in connection with rollers 6 on truck 1. Welded or otherwise integrated with the side longitudinals 19 of the trailer chassis 12 and braced by brackets 25, are overlying rails 26 which are lapped at their outsides by the runners 7 of the skid as instanced in Fig. 11, and which thereby serve to prevent lateral displacement of the skid on the trailer during transit. Centrally of its front end, the trailer 2 has a forwardly projecting hitching tongue 30, see Figs. 3 and 4, with a terminal eye 31, and with an aperture 32 at a substantial distance inward from said eye. As shown, the tongue 31 is parallel edged for the greater portion of its length but flared toward its anchorage end as at 33, the side edges of the flare being sloped at complementary angles with respect to the longitudinal axis of the tongue. From Figs. 3 and 4, it will also be observed that the front ends of rails 26 on trailer 2 are curved inwardly as at 35 to meet with a pair of forwardly converging brace members 36 of the chassis frame 12. To these brace members 36 is welded a transverse guard 37 which is rounded to engage over the roller 10 at the rear end of the truck when the trailer is hitched for loading as shown in Figs. 1 and 5. In the case of trailer 2a however, the tongue 30a is plain, i. e., devoid of any guard and permanently connected directly to the front and next adjacent cross members 20 of the chassis 12a frame as shown in Fig. 7.

In accordance with my present invention and as best shown in Fig. 5, the truck 1 is provided centrally of its rear end with a close coupling element in the form of a socket 40 immediately beneath the rear cross member 11 of its chassis frame, the opening of said socket element being flared to correspond with the flare 33 on the tongue 30 of the trailer 2. In hitching the trailer 2 in preparation for loading, its tongue 30 is passed into the socket element 40 on the truck 1 as indicated in broken lines in Fig. 6, until the flare 33 of the tongue 30 is snugly within said socket element as shown in full lines. When the tongue 30 is thus fully engaged, the aperture 32 therein will register with aligned apertures 41 respectively in the top and bottom webs of the socket element 40 on the truck as shown in Fig. 5, for reception of a locking pin 43, said pin being relatively heavy and rounded at the bottom and will therefore readily fall into the aligned apertures under the influence of gravity. The pin 43 is connected to a pull cord or cable 44 which passes through guide eyes such as indicated at 45 in Fig. 5 for convenience of access at one side of the truck chassis frame. Withdrawal of the pin 43 is effected simply by a tug upon the cord 44 as will be readily understood. When the tongue 30 is fully positioned in the socket element 40 and the guard 37 engaged over the roller 10, the trailer 2 will be rigidly held in true longitudinal alignment with the truck, and its front end leveled so that a skid will roll by gravity onto its chassis from the truck. In preparation for the loading of the trailer 2, it is to be understood that the jack 15 will be set as in Fig. 2, to sustain the chassis 12 at its front end. Again referring to Fig. 5, the truck 1 is further provided at the rear, with a supplemental coupling means 47 which will allow swivelling of the trailer 2 during transit. As shown, this supplemental coupling means comprising a hook 48 with a horizontal shank 49 which is constrained to endwise movement in apertured guide lugs 50 and 51 on the chassis frame of the truck immediately beneath the socket element 40. The movement of the hook 48 is cushioned by helical springs 52 and 53 which surround the shank 49 of said hook and which are in compression between the guide lugs 50 and 51 and a collar 54 affixed to said shank. Pivotally connected to the hook 48 to close downward upon the latter and form an eye, is a complemental arcuate keeper element 55. After a skid has been transferred to the trailer 2 and another one has been loaded upon the truck, the pin 43 is withdrawn and the truck moved forward until the socket element 40 clears the tongue 30. The jack 15 is thereupon operated to lower the front end of the trailer 2 until the eye end 31 of the tongue 30 is at the level of the hook 48 of the supplemental coupling device 47. The truck is then backed up and the hook 48 engaged with the eye end 31 of the tongue 30 on the trailer 2, the complemental element 55 dropped to close the hook, and the jack 15 finally raised and locked in the out of way position in which it is shown in Fig. 2.

The trailers 2 and 2a are respectively provided at their rear ends with socket elements 60, 60a and with supplemental coupling devices 61, 61a which are identical respectively with the socket element 40 and supplemental coupling device 47 on the truck 1.

Incident to transfer to the trailer 2, the skid is arrested by a retractable stop element which is indicated 65 in Fig. 2 and shown in detail in Figs. 9 and 10. This stop element is made up from structural iron parts with laterally spaced channel section end pieces 66 welded to a horizontal bar 67 to which a pair of laterally spaced supporting arms 68 are in turn welded, said arms being pierced for pivotal connection to a horizontal rod 69 extending between bearing lugs 70 welded to the top of the socket member 60. When in the upright position in which it is shown in full lines in Fig. 10, the stop 65 will intercept the skid by engagement of its end projections 66 with the rearmost frame cross member of said skid. When its use is not required, the stop 65 is swung downward to the dot and dash lines in Fig. 10 in which it is held by engagement of its end projections 66 with one of the intermediate cross members 20 of the trailer chassis frame as shown in broken lines in Fig. 10.

Endwise displacement as well as rise and fall of the skid on the trailer during transit are prevented by a locking means which comprises a pair of L shaped elements 71, see Figs. 2, 4 and 11, whereof the longer legs are engaged, with capacity for both endwise movement and rotation, within transversely aligned openings 72 in the side longitudinals 19 of the trailer chassis and which are connected by a tension spring 73. Normally when not in use, the locking elements 71 are positioned as in Figs. 1, 3 and 4 with the end portions of their short arms engaged in holes 74 in the side longitudinals 19 of the trailer chassis frame. After a skid has been run onto the trailer 2 and arrested by the stop 65, the elements 71 are withdrawn against the action of the spring 73, turned upright, for passage of their free ends through holes 75 in the opposite runners of the skid into engagement with eye lugs 76 recessed into and welded fast to the guard rails 26 on the trailer chassis frame as instanced in Fig. 11.

In the operation of the apparatus, the trailers 2 and 2a are set up and close coupled in alignment with the locking elements 71, 71a in their inactive positions, the stop 65 on trailer 2 dropped, and the stop 65 on trailer 29 set in upright active position. With this accomplished, the truck 1, with a filled skid thereon is backed up to the leading trailer 2 and close coupled in alignment with the truck, all as shown in Fig. 1. The skid is then released to roll from truck 1 over the trailer 2 and onto the trailer 2a until arrested by the stop 65a on the latter, and then secured in position by means of the locking elements 71a. After the trailer 2a is loaded in this way, pin of the close coupling means 60 is withdrawn and the trailer 2 pulled away by the truck to free the tongue 30a, the front end of trailer 2a lowered somewhat by operation of jack 15a and the truck re-backed for loose coupling of said tongue with the hook of the coupling device 61 of trailer 2. The truck is then detached and run off to fetch another skid, and thereupon again backed into and close coupled with the leading trailer 2. The second skid is then released to roll onto the leading trailer 2 until arrested by the stop 65 (which has been raised in the meantime) and secured in position by means of the locking devices 71. The truck is thereupon once more detached and run off to fetch another filled skid, but before being backed up this time, the jack 15 is operated to lower the front end of the trailer 2 for loose coupling of the latter to the truck by means of the device 47. The entire apparatus being now loaded, the jacks 15 and 15a are finally raised to their idle positions as in Fig. 2.

All being now in readiness, the train thus loaded is run off to a railway freight station, a processing establishment or to any other point of delivery where the contents may be withdrawn upwardly from the skids by an overhead crane without requiring their removal from the truck or necessitating breaking up the train. Upon return of the apparatus to the field, a procedure the reverse of that above described is resorted to in removing the empty skids.

It is of course to be understood that instead of two, herein shown by way of exemplification, additional trailers of the type 2a may be entrained, provided that the drawing power of the truck is not exceeded. When more than three trailers are used, I equip the last one of the series at the rear end, as instanced in Fig. 1, with a manually operable hand winch 80 for a cable to be used in drawing the skids from one trailer to another in the event that they should stick and fail to roll along under their own momentum from the truck.

Having thus described my invention, I claim:

1. In transporting apparatus of the character described, a motor truck having a chassis with a series of transverse rollers arranged in a rearwardly-declining plane, and with a cable and reeling means for drawing skids from the ground onto the rollers; a trailer having a chassis likewise with a series of rollers and releasable means for coupling the truck to the trailer temporarily with the chassis of the latter in longitudinal alignment so that, upon being freed, the skid will roll by gravity from the truck onto the trailer, said means including a socket element affixed centrally of the rear of the truck chassis and having an inwardly tapering slot opening and a pair of coaxial apertures in its top and bottom, a forwardly extending tongue centrally of the forward end of the trailer chassis having a terminal eye and a tapered portion rearwardly of said eye to fit snugly into the opening of the socket element, and a locking pin insertable through the registered openings; means for arresting the skid after it has moved into position on the trailer; and supplemental means whereby after another skid is drawn onto the truck for pivotally coupling the trailer to the truck in preparation for transit including a spring-cushioned hook element centrally of the rear end of the truck chassis below the socket element for engagement by the terminal eye of the tongue on the trailer.

2. Transporting apparatus according to claim 1, wherein the trailer is of the two-wheeled type; and wherein the trailer is provided with retractable jack means whereby its front end can be raised and lowered to facilitate connection of the rigid and pivotal coupling means.

3. In transporting apparatus of the character described, a motor truck having a chassis with a series of transverse rollers arranged in a rearwardly declining plane, a cable and powered reeling means for drawing a skid from the ground level onto the rollers; a train of interconnected trailers each having a chassis likewise with a series of transverse rollers; releasable means for temporarily coupling the trailers in longitudinal alignment with the contiguous ends of their chassis leveled and abutting, said means including socket elements affixed centrally of the rear ends of trailer and truck chassis respectively having tapering horizontal slot openings and a pair of coaxial apertures in their tops and bottoms, forwardly-projecting flat tongues centrally of the front ends of the trailers respectively having terminal eyes, tapered portions rearwardly of the eyes to snugly fit into the openings of the socket elements and apertures to register with the coaxial apertures in the socket elements, and locking pins insertable through the registering apertures; releasable means for similarly coupling the truck to the leading trailer of the series after being backed into said trailer so that upon being freed, the skids will roll by gravity from the truck to the trailers; means for arresting the skids as they roll into position on the respective trailers; and supplemental means for use after the skids are all loaded for pivotally coupling the trailers one to another and for similarly coupling the leading trailer to the truck, the last mentioned means respectively including spring-cushioned hook elements centrally of the rear ends of the truck and trailer chassis for engagement by the terminal eyes of the tongues on the trailers.

4. Transporting apparatus according to claim 3, wherein the trailers are of the two-wheeled type; and wherein the trailers are provided respectively with retractable jack means whereby their front ends can be raised and lowered to facilitate connection of the rigid and pivotal coupling means.

5. Transporting apparatus according to claim 3, wherein the truck chassis is provided centrally of its rear end with a roller over which the skids are swung incident to being drawn onto the truck; and wherein the coupling tongue on the leading trailer of the series is provided with a rounded guard to engage about the aforesaid roller on the truck chassis.

NEMESIO F. ALVARE.

References Cited in the file of this patent

UNITED STATES PATENTS

| Number | Name | Date |
|---|---|---|
| 1,563,863 | Joyner | Dec. 1, 1925 |
| 1,915,883 | Fager | June 27, 1933 |
| 2,135,857 | Stahl | Nov. 8, 1938 |
| 2,478,658 | Harbers | Aug. 9, 1949 |
| 2,508,740 | Alvare | May 23, 1950 |

FOREIGN PATENTS

| Number | Country | Date |
|---|---|---|
| 355,399 | France | Oct. 30, 1905 |